US009638096B2

(12) United States Patent
Kamijo et al.

(10) Patent No.: US 9,638,096 B2
(45) Date of Patent: May 2, 2017

(54) VEHICLE CONTROL APPARATUS

(75) Inventors: Yusuke Kamijo, Toyota (JP); Keisuke Morisaki, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 93 days.

(21) Appl. No.: 14/391,306

(22) PCT Filed: Apr. 25, 2012

(86) PCT No.: PCT/JP2012/061130
§ 371 (c)(1),
(2), (4) Date: Oct. 8, 2014

(87) PCT Pub. No.: WO2013/161025
PCT Pub. Date: Oct. 31, 2013

(65) Prior Publication Data
US 2015/0114322 A1    Apr. 30, 2015

(51) Int. Cl.
*F02B 37/12* (2006.01)
*B60K 6/445* (2007.10)
(Continued)

(52) U.S. Cl.
CPC .............. *F02B 37/12* (2013.01); *B60K 6/445* (2013.01); *B60W 10/06* (2013.01); *B60W 10/08* (2013.01); *B60W 20/00* (2013.01); *F02B 63/04* (2013.01); *B60W 2710/0638* (2013.01); *B60W 2710/0644* (2013.01); *B60W 2710/0683* (2013.01); *B60W 2710/083* (2013.01); *B60Y 2400/435* (2013.01);
(Continued)

(58) Field of Classification Search
CPC ...... B60W 10/06; B60W 10/08; B60W 20/00; B60W 2710/0638; B60W 10/115; F02D 41/0007; F02D 23/00; F02B 39/06; F02C 6/12
USPC .......................... 123/2, 383, 559.1, 561–566; 701/101–105; 60/608, 607
See application file for complete search history.

(56) References Cited

U.S. PATENT DOCUMENTS 6,705,084 B2 *  3/2004  Allen ....................... F02B 37/10
                                                         60/608
7,524,266 B2 *  4/2009  Nobumoto ............ B60W 10/06
                                                         477/107
(Continued)

FOREIGN PATENT DOCUMENTS

JP    2003-111206 A    4/2003
JP    2007-314127 A    12/2007

Primary Examiner — Long T Tran
(74) Attorney, Agent, or Firm — Sughrue Mion, PLLC

(57) ABSTRACT

A vehicle is equipped with an internal combustion engine having a forced-induction apparatus with variable boost pressure, a first motor generator for generating electricity while applying negative torque to the engine, and a battery for storing the electricity generated by the first motor generator. During the operation of the engine, a target boost pressure is set lower as the rotational speed of the first motor generator is increased. The engine is controlled such that, with the boost pressure adjusted to the target boost pressure, the output torque of the engine has a required value determined by the accelerator operation amount. Further, while the output torque of the engine is adjusted to the required value, the magnitude of the negative torque by the first motor generator acting on the engine is adjusted such that the engine rotational speed has a target value.

9 Claims, 6 Drawing Sheets

(51) Int. Cl.
  *B60W 10/06*   (2006.01)
  *B60W 20/00*   (2016.01)
  *B60W 10/08*   (2006.01)
  *F02B 63/04*   (2006.01)

(52) U.S. Cl.
  CPC ........ *Y02T 10/6239* (2013.01); *Y02T 10/6286* (2013.01)

(56) References Cited

U.S. PATENT DOCUMENTS

| | | | | |
|---|---|---|---|---|
| 7,628,015 B2* | 12/2009 | Marumoto | ............. | F02B 33/34 60/607 |
| 2003/0005695 A1* | 1/2003 | Allen | ............. | F02B 37/10 60/608 |
| 2007/0078040 A1* | 4/2007 | Nobumoto | ............. | B60W 10/06 477/70 |
| 2010/0121508 A1* | 5/2010 | Murata | ............. | B60K 6/445 701/22 |
| 2011/0112734 A1* | 5/2011 | Whitney | ............. | B60W 30/20 701/54 |
| 2012/0072064 A1* | 3/2012 | Kumazaki | ............. | F16H 61/0213 701/22 |
| 2012/0101691 A1* | 4/2012 | Otsuka | ............. | F02D 11/105 701/48 |
| 2012/0108384 A1* | 5/2012 | Tabata | ............. | B60K 6/445 477/3 |
| 2012/0318235 A1* | 12/2012 | Kaiser | ............. | F02D 11/105 123/350 |
| 2013/0325234 A1* | 12/2013 | Shibata | ............. | B60W 20/106 701/22 |

\* cited by examiner

VEHICLE CONTROL APPARATUS

CROSS REFERENCE TO RELATED APPLICATIONS

This application is a National Stage of International Application No. PCT/JP2012/061130, filed on Apr. 25, 2012, the contents of all of which are incorporated herein by reference in their entirety.

TECHNICAL FIELD

The present invention relates to a control apparatus for a vehicle.

BACKGROUND ART

In a vehicle equipped with a motor and an internal combustion engine as drive sources, the motor and the internal combustion engine are driven and controlled so that vehicle-required power required based on the accelerator operation amount and the vehicle speed is obtained. An electric motor-generator is operated by the internal combustion engine to generate electricity, thereby obtaining electricity for driving the motor and the like. When the electric motor-generator is operated by the internal combustion engine to generate electricity, negative torque generated by the electric motor-generator, i.e., torque that suppresses rotation of the engine acts on the engine.

In such a vehicle, the motor, the internal combustion engine, and the electric motor-generator are driven and controlled to reduce energy consumption in the entire vehicle to the extent possible. In the driving and control operation of the internal combustion engine at this time, output torque during operation of the engine is adjusted to a required value that is set based on the vehicle-required power. When electricity is generated by the electric motor-generator through the driving and control operation of the electric motor-generator, the motor is driven using electricity generated at that time, and surplus amount of electricity that cannot be consumed by the driving operation of the motor is stored in a battery mounted in the vehicle.

To improve the fuel economy of the internal combustion engine mounted in the vehicle, it is effective to provide the engine with a forced-induction device. As the internal combustion engine mounted in the vehicle, it is possible to employ an internal combustion engine having a forced-induction device shown in Patent Document 1, for example. The internal combustion engine having the forced-induction device of Patent Document 1 is provided with a variable boost pressure mechanism for adjusting boost pressure of the engine caused by the forced-induction device. When the electric motor-generator, which is operated by the internal combustion engine to generate electricity, is brought into high temperature, the boost pressure of the engine is lowered through a driving and control operation of the variable boost pressure mechanism. In this case, by lowering the boost pressure, output torque of the internal combustion engine can be lowered. Accordingly, it is possible to suppress heat generation when the electric motor-generator is operated to generate electricity by the engine, and to protect the electric motor-generator.

PRIOR ART DOCUMENT

Patent Document

Patent Document 1: Japanese Laid-Open Patent Publication No. 2007-314127

SUMMARY OF THE INVENTION

Problems that the Invention is to Solve

Patent Document 1 does not describe how to adjust the boost pressure of the internal combustion engine when, in a normal state where it is unnecessary to protect the electric motor-generator, the output torque of the engine is adjusted to the required value, which is set based on the vehicle-required power in accordance with the accelerator operation amount through the driving and control operation of the internal combustion engine. From this fact, it is assumed that, in Patent Document 1, the problem as to how the boost pressure of the internal combustion engine should be adjusted in the normal state, where it is unnecessary to protect the electric motor-generator, is not sufficiently studied.

In a vehicle equipped with only the internal combustion engine as the drive source, boost pressure is generally adjusted based on an operation state of the internal combustion engine. However, if such an adjusting manner of the boost pressure is applied to the adjustment of boost pressure of the internal combustion engine in the vehicle equipped with a motor as well as the internal combustion engine as the drive source, since the boost pressure is adjusted based on only the operation state of the internal combustion engine without taking the electric motor-generator into account, the problems shown in the following [1] and [2] arise.

[1] The higher the boost pressure of the internal combustion engine, the more easily the output torque of the engine rises. Therefore, if the boost pressure temporarily excessively rises due to variation in the operation state of the engine, the output torque of the internal combustion engine excessively increases in accordance with the excessive rise in the boost pressure, and the engine speed excessively rises. When the electric motor-generator is operated by the internal combustion engine to generate electricity when the output torque of the engine excessively increases, negative torque acts on the internal combustion engine by the electric motor-generator. It is thus possible to somewhat suppress the excessive rise in the engine speed. However, the magnitude of the negative torque caused by the electric motor-generator acting on the internal combustion engine varies in accordance with the operation state (the rotation speed or the like) of the electric motor-generator. Therefore, depending upon the operation state of the electric motor-generator, it becomes difficult to suppress the excessive rise in the engine speed by the negative torque of the electric motor-generator acting on the internal combustion engine.

[2] If the engine speed excessively rises under a situation in which the electric motor-generator is operated by the internal combustion engine to generate electricity as shown in [1], a power generation amount of the electric motor-generator becomes excessive, and the durability of components will deteriorated due to the overcurrent.

The vehicle of Patent Document 1 employs a structure in which the electric motor-generator can rotate relative to the internal combustion engine and rotation speed of the electric motor-generator varies in accordance with vehicle speed. Therefore, the rotation speed (operation state) of the electric motor-generator becomes largely different from the engine speed in accordance with vehicle speed. As a result, the problem shown in [1] arises more significantly.

It is an objective of the present invention to provide a control apparatus for a vehicle capable of preventing an engine speed from being excessively increased due to an increase in boost pressure in an internal combustion engine caused by a forced-induction device, and capable of suppressing deterioration of the durability of components caused by overcurrent when a power generation amount of the electric motor-generator is excessively increased.

Means for Solving the Problems

To achieve the foregoing objective and in accordance with the present invention, a control apparatus for a vehicle is provided that includes an internal combustion engine with a forced-induction apparatus, an electric motor-generator that generates electricity while applying negative torque to the engine, and a battery in which electricity generated by the electric motor-generator is stored. The forced-induction apparatus includes a forced-induction device and a variable boost pressure mechanism that varies boost pressure caused by the forced-induction device. The control apparatus sets a required value of output torque of the engine in accordance with an accelerator operation amount. The control apparatus controls the variable boost pressure mechanism such that the boost pressure is adjusted to coincide with a target boost pressure that is set based on an operation state of the internal combustion engine. The control apparatus further comprises a controller. The higher rotation speed of the electric motor-generator, the lower the target boost pressure set by the controller becomes. In a state where the boost pressure is made to match with the target boost pressure, the controller controls the internal combustion engine such that output torque of the internal combustion engine becomes equal to the required value, which is determined by the accelerator operation amount.

In an internal combustion engine having a forced-induction device, there is a tendency that the higher the boost pressure of the engine, the more easily the output torque thereof rises. In the electric motor-generator, in which electricity is generated in a state where negative torque is made to act on the internal combustion engine, the magnitude of the negative torque, which can act on the engine, varies in accordance with rotation speed of the electric motor-generator. More specifically, the higher the rotation speed of the electric motor-generator, the smaller the maximum value of negative torque that can act on the internal combustion engine by the electric motor-generator becomes.

Hence, if the target boost pressure of the internal combustion engine is set based on only the engine operation state without taking the operation state (rotation speed) of the electric motor-generator into account, the target boost pressure of the internal combustion engine can be set to a high value in some cases when the electric motor-generator rotates at such rotation speed that the maximum value of the negative torque that can act on the internal combustion engine is small. Under such a situation, when the boost pressure of the internal combustion engine is adjusted to coincide with the target boost pressure, if the boost pressure of the internal combustion engine temporarily excessively rises due to variation in the engine operation state and output torque of the engine excessively rises, there will be concern that this excessive rise in the engine speed at that time cannot be suppressed by the negative torque, which is caused by the electric motor-generator and acts on the internal combustion engine. Under such a situation in which the negative torque caused by the electric motor-generator is made to act on the internal combustion engine, i.e., under such a situation in which electricity is generated in the electric motor-generator by the internal combustion engine, if the engine speed excessively rises as described above, the power generation amount of the electric motor-generator increases excessively and the durability of components will deteriorate due to overcurrent.

To solve such problems, in the control apparatus, the higher the rotation speed of the electric motor-generator, the lower the target boost pressure of the internal combustion engine is set. In a state where the boost pressure caused by the forced-induction device is adjusted to coincide with the target boost pressure, the internal combustion engine is controlled such that the output torque of the internal combustion engine becomes equal to the required value, which is determined by the accelerator operation amount.

In this case, if the rotation speed of the electric motor-generator becomes higher and the maximum value of the negative torque, which is caused by the electric motor-generator and acts on the internal combustion engine, becomes smaller, the target boost pressure of the internal combustion engine is set lower and the boost pressure of the engine becomes lower. When the boost pressure is low, the output torque of the internal combustion engine is less prone to rise. Therefore, the degree of rise in the output torque of the internal combustion engine caused by temporary excessive rise in the boost pressure caused by variation or the like of the engine operation state also becomes small. Therefore, rise in the engine speed caused by rise in the output torque of the internal combustion engine can be suppressed by the negative torque, which is caused by the electric motor-generator and acts on the engine. In a state where the negative torque caused by the electric motor-generator is made to act on the internal combustion engine, i.e., under such a situation in which electricity of the electric motor-generator is generated by the internal combustion engine, it is possible to suppress the excessive power generation amount of the electric motor-generator caused by excessive rise in the engine speed by suppressing the rise in the engine speed as described above, and it is possible to prevent the power generation amount from becoming excessively large, so that the durability of components will not deteriorates due to overcurrent.

As described above, the higher the rotation speed of the electric motor-generator becomes, the lower the target boost pressure is set. At this time, it is preferable that the controller sets the target boost pressure such that the higher the rotation speed of the electric motor-generator becomes, the lower the boost pressure when output torque of the internal combustion engine is adjusted to coincide with the required value becomes.

In accordance with one aspect of the present invention, the controller sets an upper limit value of the target boost pressure, which is set based on the engine operation state, such that the higher the rotation speed of the electric motor-generator, the lower the upper limit value becomes. The controller limits the target boost pressure by the upper limit value such that the higher the rotation speed of the electric motor-generator, the lower the target boost pressure becomes. The required value of the output torque of the internal combustion engine is set as a value under a situation in which the boost pressure is lower than or equal to the upper limit value of the target boost pressure.

According to one aspect of the present invention, the controller sets the target boost pressure based on the engine operation state, the rotation speed of the electric motor-generator and the voltage for operating the electric motor-generator. In an electric motor-generator that generates electricity while making negative torque act on the internal combustion engine, the maximum value of the negative torque that can act on the engine varies in accordance with not only the rotation speed of the electric motor-generator but also the voltage. More specifically, the lower the voltage for operating the electric motor-generator, the smaller the maximum value of negative torque that can act on the internal combustion engine by the electric motor-generator becomes. Hence, it is preferable that the lower the voltage, the lower the target boost pressure set by the controller becomes. In this case, the boost pressure of the internal combustion engine caused by the forced-induction device is made to match with a target boost pressure that is set lower as the voltage becomes lower.

In accordance with another aspect of the present invention, the vehicle is provided with a differential device including a first rotation element, a second rotation element, and a third rotation element. Power that is output from the internal combustion engine is transmitted to a drive shaft of the vehicle and the electric motor-generator through the differential device. The first rotation element is connected to the internal combustion engine. The second rotation element is connected to the electric motor-generator. The third rotation element is connected to the drive shaft. The controller adjusts the magnitude of the negative torque that is caused by the electric motor-generator and acts on the internal combustion engine, thereby controlling the engine speed to become a target value. In this case, during operation of the internal combustion engine, while the output torque of the internal combustion engine is adjusted to coincide with the required value through a driving and control operation of the internal combustion engine, and the magnitude of the negative torque that acts on the internal combustion engine is adjusted such that the engine speed becomes equal to a target value through the driving and control operation of the electric motor-generator that makes negative torque act on the internal combustion engine.

If the target boost pressure is set by the forced-induction device in the internal combustion engine based on only the engine operation state without taking the operation state (rotation speed) of the electric motor-generator into account, the target boost pressure of the internal combustion engine can be set to a high value when the electric motor-generator rotates at such speed that the maximum value of the negative torque that can act on the internal combustion engine is small. Under such a situation, when the boost pressure of the internal combustion engine is adjusted to coincide with the target boost pressure, as the boost pressure of the internal combustion engine temporarily excessively rises due to variation or the like of the engine operation state, if the output torque of the engine excessively rises, the negative torque caused by the electric motor-generator, which is required for suppressing the engine speed to the target value, also becomes large. However, there is a limit on enlargement of the negative torque caused by the electric motor-generator, and if the engine speed cannot be limited to the target value even if the maximum value of the negative torque is made to act on the internal combustion engine, the engine speed excessively rises in relation to the target value. In a state where the maximum value of the negative torque caused by the electric motor-generator is made to act on the internal combustion engine, if the engine speed excessively rises in relation to the target value as described above, the power generation amount of the electric motor-generator becomes excessively large, and the durability of components largely deteriorates due to overcurrent.

However, it is possible to solve such problems by setting the target boost pressure of the internal combustion engine to a lower value as the rotation speed of the electric motor-generator becomes higher. In this case, in a state where the boost pressure caused by the forced-induction device matches with the target boost pressure, which is set as described above, the rotation speed of the electric motor-generator becomes high, and the smaller the feasible maximum value of the negative torque that acts on the internal combustion engine by the electric motor-generator becomes, the lower the boost pressure of the internal combustion engine becomes, so that the output torque of the engine is less prone to temporarily and excessively rise. Therefore, when the negative torque caused by the electric motor-generator is made to act on the internal combustion engine to limit the engine speed to the target value, the output torque of the internal combustion engine is prevented from temporarily excessively rising under a situation in which the feasible maximum value of the negative torque becomes small. Thus, the negative torque will not become insufficient, and the engine speed can be limited to the target value. In other words, it is possible to restrain the engine speed from excessively rising in relation to the target value. Moreover, in a state in which the maximum value of the negative torque caused by the electric motor-generator is made to act on the internal combustion engine, the engine speed is prevented from excessively rising in relation to the target value as described above, so that the power generation amount of the electric motor-generator will not become excessively large. The durability of components therefore will not deteriorate significantly due to overcurrent.

The above described differential device may be provided with a planetary gear train including a planetary gear, which is the first rotation element, a sun gear, which is the second rotation element, and a ring gear, which is the third rotation element. In this case, the internal combustion engine is connected to the planetary gear such that rotation can be transmitted, the electric motor-generator is connected to the sun gear such that rotation can be transmitted, and the drive shaft of the vehicle is connected to the ring gear such that rotation can be transmitted.

According to one aspect of the present invention, only when a failure caused by power generation of the electric motor-generator arises, the following setting is executed: that is, the higher the rotation speed of the electric motor-generator, the lower the target boost pressure is set. Examples of the failure caused by power generation of the electric motor-generator include a case where electricity is excessively generated by the electric motor-generator and the temperature of the electric motor-generator becomes abnormally high, and a case where power generation of the electric motor-generator is limited to suppress overcharging of a battery of a vehicle by power generation in the electric motor-generator. When such a failure caused by power generation of the electric motor-generator arises, it is difficult to increase the negative torque when the negative torque is made to act on the internal combustion engine by the electric motor-generator. Due to such a shortage of the negative torque, it is highly probable that excessive rise in the engine speed cannot be suppressed. Only under such a situation, when the rotation speed of the electric motor-generator becomes higher, the target boost pressure is set lower. According to this, it is possible to suppress the occurrence of the above-described problem without uselessly setting the variability of the target boost pressure based on the rotation speed of the electric motor-generator.

According to one aspect of the present invention, the higher the rotation speed of the electric motor-generator, the lower the target boost pressure set by the controller becomes. In a state where the boost pressure of the internal combustion engine caused by the forced-induction device is made to match with the target boost pressure, the internal combustion engine is controlled such that the output torque of the engine becomes equal to a required value that is determined by the accelerator operation amount. When the internal combustion engine is controlled in such a manner, if the output torque of the internal combustion engine is insufficient in relation to the required value, the throttle opening degree of the internal combustion engine is increased to compensate for the shortage. According to this, it is possible to make the output torque of the internal combustion engine match with the required value whenever possible. Moreover, if it is not possible to compensate for the shortage in the output torque of the internal combustion engine even if the throttle opening degree is increased, the negative torque that is made to act on the internal combustion engine by the electric motor-generator is reduced, and the engine speed is increased. According to this, power that is output from the internal combustion engine is prevented from being influenced by the shortage in the output torque. Further, if the engine speed exceeds the permissible upper limit value due to rise in the engine speed, the throttle opening degree of the internal combustion engine is reduced to suppress the rise in the engine speed. It is therefore possible to suppress the excessive rise in the engine speed.

According to one aspect of the present invention, the forced-induction device is configured as a turbocharger, which is driven by flow of exhaust gas of the internal combustion engine.

MODES FOR CARRYING OUT THE INVENTION

A control apparatus of a hybrid vehicle according to one embodiment of the present invention will be described with reference to FIGS. 1 to 10. The hybrid vehicle is provided with an internal combustion engine and a motor as drive sources.

Figure 1:
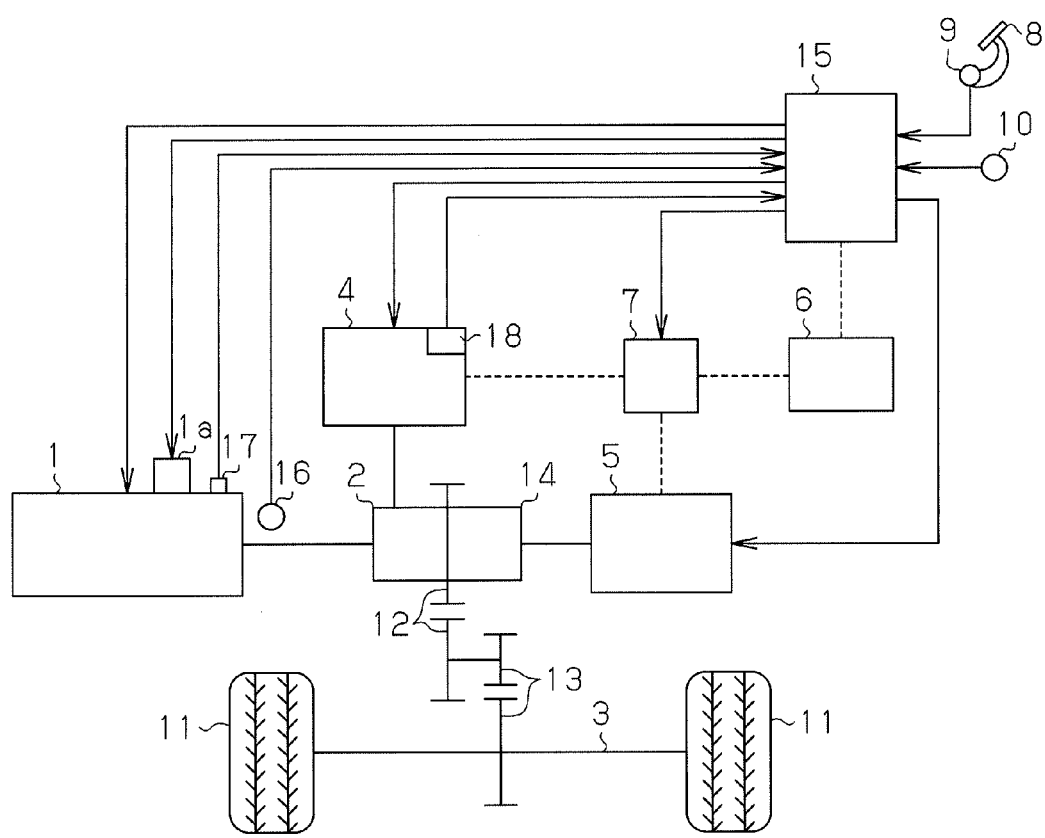
FIG. 1 is a schematic diagram showing the structure of a vehicle to which a control apparatus of the present invention is applied.

As shown in FIG. 1, an internal combustion engine 1 provided in a vehicle is provided with a forced-induction apparatus 1a including a forced-induction device such as a turbocharger, which is driven by flow of exhaust gas of the engine 1. The forced-induction apparatus 1a includes a variable boost pressure mechanism that varies boost pressure of the internal combustion engine 1, which is supercharged by the forced-induction device. This mechanism can adjust the boost pressure. If a turbocharger is employed as the forced-induction device of the forced-induction apparatus 1a, a wastegate valve for adjusting the amount of exhaust gas delivered to a turbine of the turbocharger may be employed.

The power output from the internal combustion engine 1, which includes the forced-induction apparatus 1a, is divided by a power-split gear mechanism 2 into power transmitted to a drive shaft 3 of the vehicle through a counter gear 12 and a final gear 13, and power transmitted to a first motor generator 4. The power-split gear mechanism 2 functions as a differential device, which transmits power output from the internal combustion engine 1 to the drive shaft 3 and the first motor generator 4 of the vehicle. As the differential device (power-split gear mechanism 2), it is possible to employ a device having three rotation elements including a first rotation element, a second rotation element, and a third rotation element. As the power-split gear mechanism 2, a differential device provided with a planetary gear train including a planetary gear, which is the first rotation element, a sun gear, which is the second rotation element, and a ring gear, which is the third rotation element, is employed. In the planetary gear train of the power-split gear mechanism 2, the planetary gear is connected to the internal combustion engine 1 such that rotation can be transmitted, the sun gear is connected to the first motor generator 4 such that rotation can be transmitted, and the ring gear is connected to the drive shaft 3 through the counter gear 12 and the final gear 13 such that rotation can be transmitted.

The power that is output from a second motor generator 5 is transmitted to the drive shaft 3 of the vehicle through the counter gear 12, the final gear 13, and a reduction gear mechanism 14, which includes a planetary gear train. By transmitting power to the drive shaft 3, wheels 11 connected to the drive shaft 3 rotate and the vehicle runs. In the planetary gear train of the reduction gear mechanism 14, a sun gear is connected to the second motor generator such that rotation can be transmitted, a ring gear is integrally rotationally connected to the ring gear of the planetary gear train of the power-split gear mechanism 2, and a planetary gear is fixed such that it does not orbit about the sun gear or the ring gear of the planetary gear train in the reduction gear mechanism 14.

The first motor generator 4 functions mainly as an electricity generator, but also functions as a motor depending upon the operation state of the vehicle such as a starting state of the internal combustion engine 1. The second motor generator 5 functions mainly as a motor, but also functions as an electricity generator depending upon the operation state of the vehicle such as a decelerating state. The vehicle is provided with an inverter 7, which controls input and output of electricity between a battery 6 and the first and second motor generators 4 and 5. For example, the inverter 7 supplies, to the battery 6, electricity obtained by generation of electricity in the first motor generator 4, which functions mainly as the electricity generator, and charges up the battery 6. The inverter 7 supplies electricity from the battery 6 and the first motor generator 4 to the second motor generator 5, which functions mainly as the motor.

The vehicle is provided with an electronic control apparatus 15, which controls various kinds of devices mounted in the vehicle. The electronic control apparatus 15 functions as a controller that drives and controls the internal combustion engine 1, drives and controls the forced-induction apparatus 1a (variable boost pressure mechanism), and drives and controls the first motor generator 4 and the like.

The electronic control apparatus 15 includes a CPU, which executes computation processing related to control of the various kinds of devices, a ROM, in which programs and data required for the control are stored, a RAM, in which computation results or the like of the CPU are temporarily stored, and input/output ports for inputting and outputting signals between the electronic control apparatus 15 and the outside. An accelerator position sensor 9 for detecting the operation amount (accelerator operation amount) of an accelerator pedal 8, which is operated by the driver of the vehicle, and a vehicle speed sensor 10 for detecting the running speed (vehicle speed) of the vehicle are connected to the input port of the electronic control apparatus 15. Further, a crank position sensor 16 for outputting a signal corresponding to rotation of a crankshaft of the internal combustion engine 1, a pressure sensor 17 for detecting intake pressure (boost pressure) of the internal combustion engine 1, and a rotation speed sensor 18 for detecting the rotation speed of the first motor generator 4 are also connected to the input port. Drive circuits for various kinds of devices for operating the internal combustion engine 1, a drive circuit for the forced-induction apparatus 1a (variable boost pressure mechanism), a drive circuit for the first motor generator 4, a drive circuit for the second motor generator 5 and a drive circuit of the inverter 7 are connected to the output port of the electronic control apparatus 15.

The electronic control apparatus 15 obtains vehicle-required power Pt based on the operation state such as vehicle speed V and an accelerator operation amount ACCP, and an electricity storage amount SOC of the battery 6, and controls the power output from the internal combustion engine 1 and the power output from the second motor generator 5 so that the vehicle-required power Pt is obtained. At this time, the first motor generator 4 operated by the internal combustion engine 1 is made to function as the electricity generator to generate electricity, and electricity for driving the second motor generator 5 and the like and for charging up the battery 6 is obtained. The internal combustion engine 1, the first motor generator 4, and the second motor generator 5 in the vehicle are driven and controlled to minimize the energy consumption of the entire vehicle.

Next, processing executed by the electronic control apparatus 15 when the internal combustion engine 1, the first motor generator 4, and the second motor generator 5 in the vehicle are driven and controlled will be described.

Figure 2:
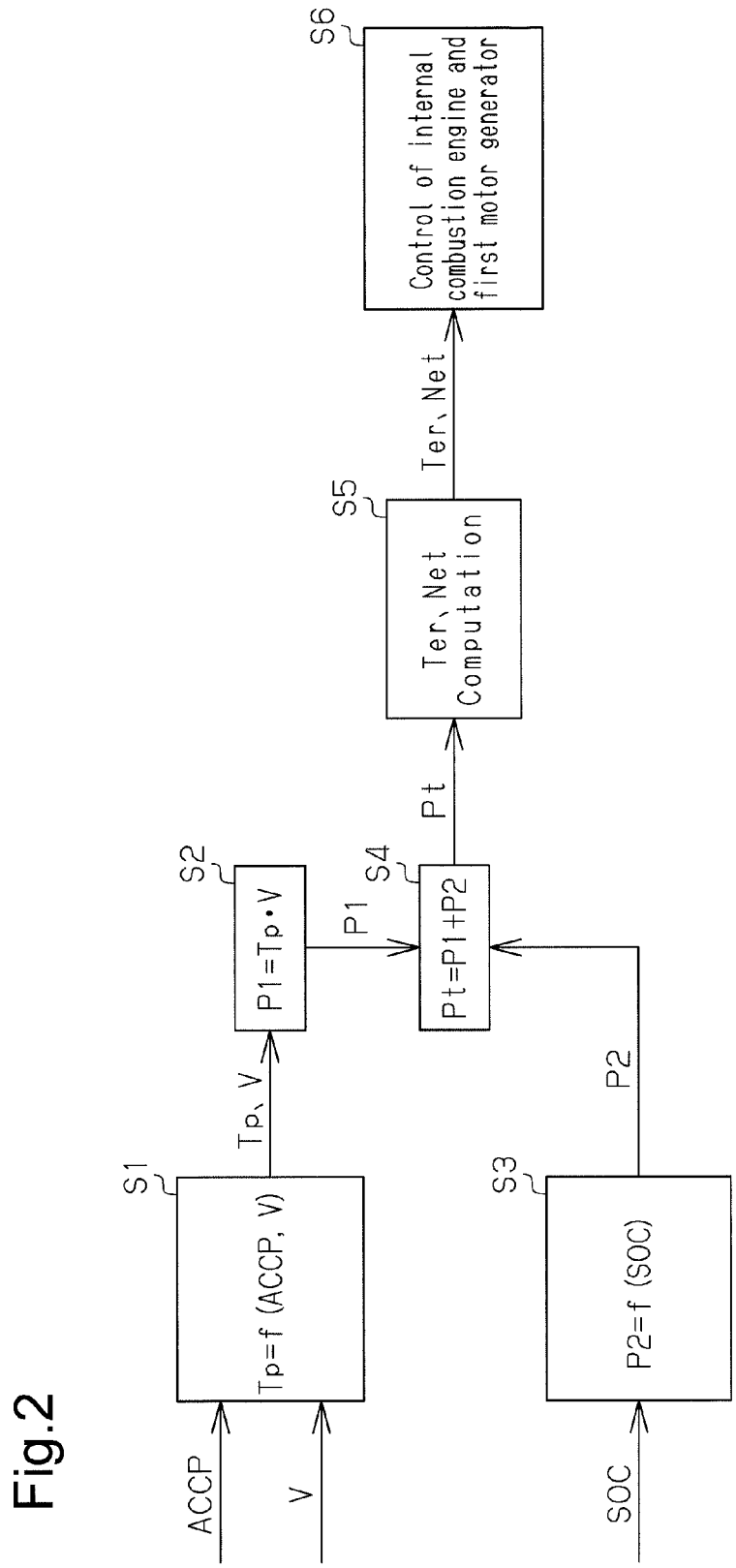
FIG. 2 is a control block diagram showing the outline of processing for driving and controlling an internal combustion engine and a first motor generator.
Figure 3:
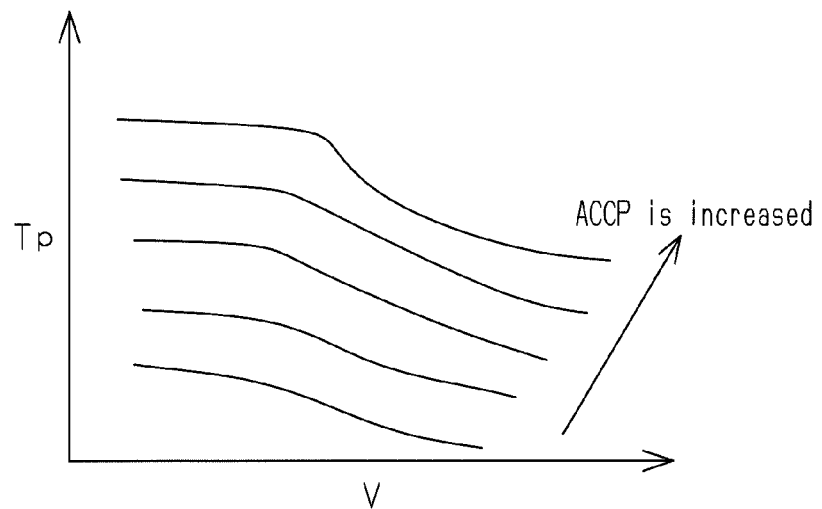
FIG. 3 is a graph showing changes in driver-required torque in response to variations in the vehicle speed and the accelerator operation amount.

FIG. 2 is a control block diagram showing the outline of series of processing (S1 to S5) for driving and controlling the internal combustion engine 1 and the first motor generator 4. In this series of processing, first, driver-required torque Tp, which is output torque from the drive shaft 3 of the vehicle required by the driver, is calculated based on the accelerator operation amount ACCP and the vehicle speed V (S1). The driver-required torque Tp calculated in this manner varies in response to variation in the vehicle speed V and the accelerator operation amount ACCP as shown in FIG. 3. Based on the driver-required torque Tp and the vehicle speed V, traveling power P1 is calculated as power of the internal combustion engine 1 required for traveling the vehicle in accordance with driver's requirement (S2).

Figure 4:
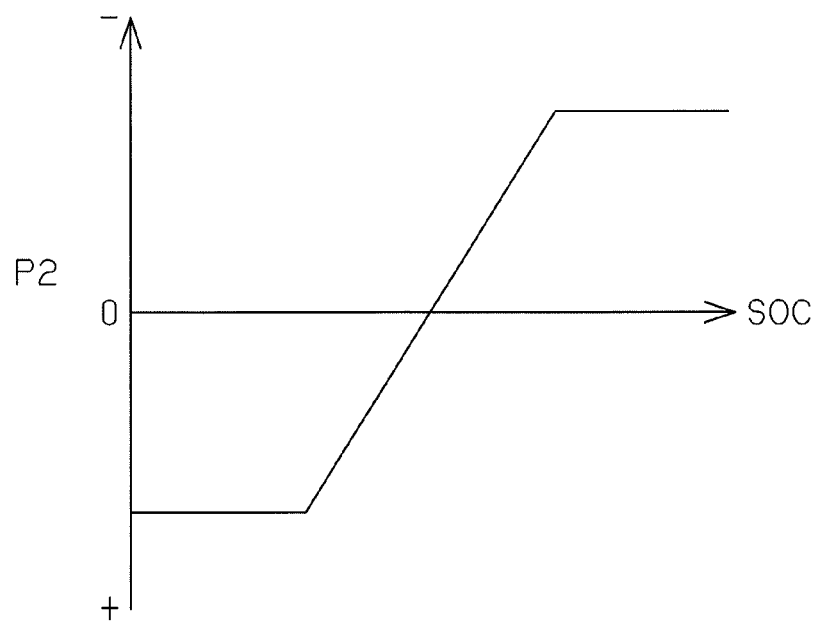
FIG. 4 is a graph showing changes in charge/discharge-required power in response to variation in the electricity storage amount of a battery.

On the other hand, as shown in FIG. 2, charge/discharge-required power P2 is calculated as power of the internal combustion engine 1 required for operating the first motor generator 4 to generate electricity based on the electricity storage amount SOC of the battery 6 (S3). The charge/discharge-required power P2 calculated in this manner varies in response to variation in the electricity storage amount SOC as shown in FIG. 4. By totalizing the charge/discharge-required power P2 and the traveling power P1, the vehicle-required power Pt is calculated as shown in FIG. 2 (S4). The vehicle-required power Pt is the total value of power required to output from the internal combustion engine 1 in the entire vehicle. If the vehicle-required power Pt is calculated, a required value Ter of output torque Te of the engine 1 and a target value Net of the engine speed Ne for outputting power corresponding to the vehicle-required power Pt from the internal combustion engine 1 are calculated (S5).

Figure 5:
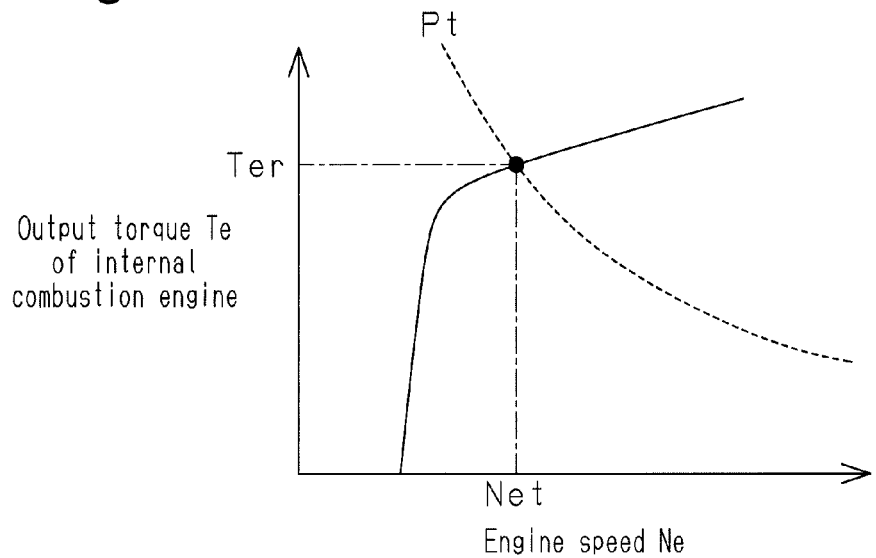
FIG. 5 is a graph showing a combination of the output torque and the engine speed when the internal combustion engine is operated in an optimum fuel economy state.

The power of the internal combustion engine 1 is determined by a combination of the output torque Te and the engine speed Ne of the engine 1. A combination (operational point) of the output torque Te and the engine speed Ne that optimizes fuel economy of the internal combustion engine 1 varies along a solid line (fuel economy optimal line) in FIG. 5 for example with respect to variation in power of the internal combustion engine 1. In FIG. 5, the vehicle-required power Pt is shown by a broken line. The broken line showing the vehicle-required power Pt varies as follows for example in response to the magnitude of the vehicle-required power Pt. That is, as the vehicle-required power Pt becomes smaller, the broken line approaches the origin of the graph in FIG. 5, and as the vehicle-required power Pt becomes larger, the broken line separates away from the origin of the graph in FIG. 5. In the processing in S5 in FIG. 2, an operational point at which the broken line showing the vehicle-required power Pt and the fuel economy optimal line (solid line) in FIG. 5 intersect with each other, i.e., a combination of the output torque Te and the engine speed Ne is obtained. The output torque Te in this combination is calculated as the required value Ter of the output torque Te of the internal combustion engine 1, and the engine speed Ne in this combination is calculated as the target value Net of the engine speed Ne.

The required value Ter calculated in this manner is a value determined based on the accelerator operation amount ACCP of the driver or the like through processing of S1 to S5 in FIG. 2. If the required value Ter of the output torque Te and the target value Net of the engine speed Ne of the internal combustion engine 1 are calculated in the processing of S5, the internal combustion engine 1 is driven and controlled, for example, the throttle opening degree of the engine 1 is controlled such that the output torque Te of the engine 1 becomes equal to the required value Ter. Further, the output torque Te of the engine 1 is adjusted to coincide with the required value Ter through the driving and control operation of the engine 1 and under such a situation, the first motor generator 4 which functions as the electricity generator is driven and controlled such that the engine speed Ne becomes equal to the target value Net. That is, negative torque Tg, which is caused by the first motor generator 4 and acts on the internal combustion engine 1, i.e., the magnitude of torque that reduces the engine rotation is adjusted such that the engine speed Ne obtained based on a detection signal of the crank position sensor 16 becomes equal to the target value Net.

Figure 6:
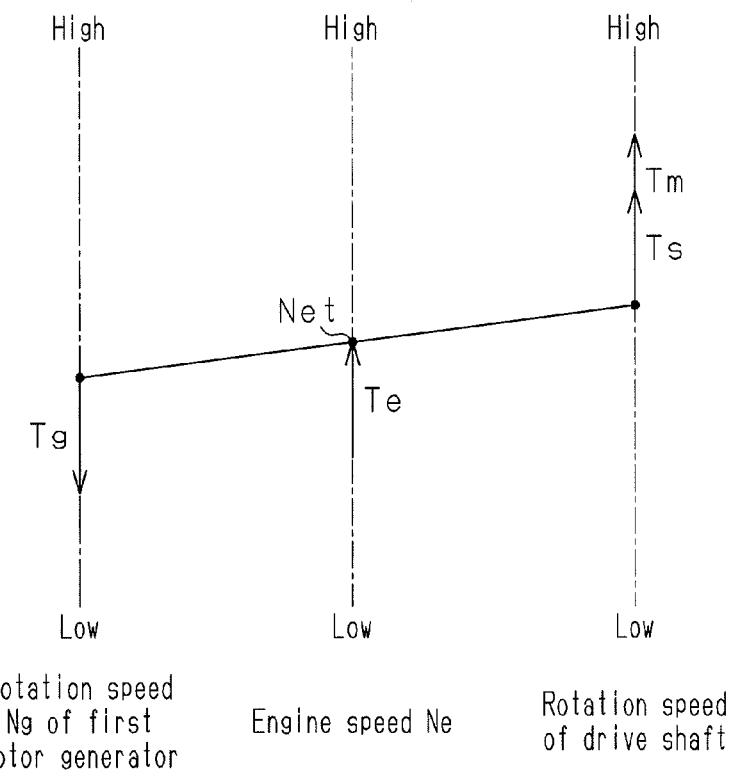
FIG. 6 is an explanatory diagram showing a relationship among the negative torque caused by the first motor generator, the output torque and engine speed of the internal combustion engine, and the torque that is output from the drive shaft.
Figure 7:
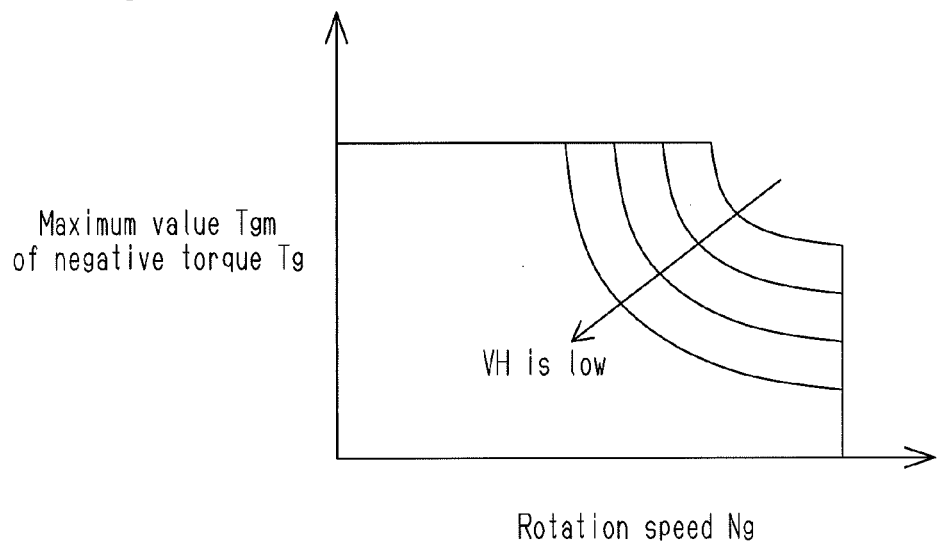
FIG. 7 is a graph showing changes in the rotation speed of the first motor generator and the maximum value of the negative torque caused by the first motor generator, which varies in accordance with a boosted voltage for operating the first motor generator.

FIG. 6 shows a relationship among the output torque Te, the engine speed Ne, and the negative torque Tg when the output torque Te of the internal combustion engine 1 is adjusted to coincide with the required value Ter and the engine speed Ne is adjusted to coincide with the target value Net. When the output torque Te of the internal combustion engine 1 is adjusted to coincide with the required value Ter, the larger the output torque Te, the larger the negative torque Tg required for limiting the engine speed Ne to the target value Net becomes. When the internal combustion engine 1 is steadily operated in a state where the output torque Te is adjusted to coincide with the required value Ter and the engine speed Ne is adjusted to coincide with the target value Net, the relationship of the equation "Te=−{(1+φ/ρ)·Tg" is established between the output torque Te and the negative torque Tg. In this equation, "ρ" represents the ratio of the number of teeth of the sun gear and the ring gear of the planetary gear train in the power-split gear mechanism 2.

In the state where the output torque Te is adjusted to coincide with the required value Ter and the engine speed Ne is adjusted to coincide with the target value Net, torque Ts transmitted from the internal combustion engine 1 to the drive shaft 3 is represented by the equation "Ts={1/(1+ρ)}·Te". If this torque Ts does not reach the driver-required torque Tp, the second motor generator 5 is driven and controlled such that the shortage of torque (driver-required torque Tp−torque Ts) is output from the second motor generator 5. Torque Tm transmitted from the second motor generator 5 to the drive shaft of the vehicle is represented by the equation "Tm=Tp−Ts". By adjusting the output torque of the second motor generator 5 through a driving and control operation of the second motor generator 5 such that the torque Tm is obtained, output torque from the drive shaft 3 of the vehicle is made to match with the driver-required torque Tp.

Next, the outline of boost pressure control of the internal combustion engine 1, which is carried out through the electronic control apparatus 15, will be described.

The following operations are carried out to control the boost pressure of the internal combustion engine 1. That is, target boost pressure is obtained based on the engine operation state such as output torque Te and engine speed Ne of the internal combustion engine 1, and the forced-induction apparatus 1a (variable boost pressure mechanism) shown in FIG. 1 is driven such that the actual boost pressure of the internal combustion engine 1 matches with the target boost pressure. When the boost pressure of the internal combustion engine 1 is adjusted to coincide with the target boost pressure, the higher the boost pressure, the more easily the output torque Te of the engine rises. Hence, when the fuel economy optimal line (solid line) shown in FIG. 3 used for setting the required value Ter of the output torque Te and the target value Net of the engine speed Ne of the internal combustion engine 1 is determined, it is preferable that the fuel economy optimal line is determined on the assumption that boost pressure of the internal combustion engine 1 is adjusted to coincide with the target boost pressure, which is varied and set in accordance with the engine operation state.

In the internal combustion engine 1, in which the boost pressure is controlled, there is a tendency that the higher the boost pressure, the more easily the output torque Te of the engine 1 rises as described above. In the first motor generator 4, which makes negative torque Tg act on the internal combustion engine 1, a maximum value Tgm of the negative torque Tg, which can act on the engine 1, varies in accordance with rotation speed Ng of the first motor generator 4. More specifically, the maximum value Tgm of the negative torque Tg caused by the first motor generator 4 changes as shown by a solid line in FIG. 7 in response to variation of the rotation speed Ng of the first motor generator 4, and this change varies as shown by an arrow in response to reduction of boosted voltage VH which is for operating the first motor generator 4. Hence, in the maximum value Tgm of the negative torque Tg caused by the first motor generator 4, there is a tendency that the higher the rotation speed Ng of the first motor generator 4, the smaller the maximum value Tgm becomes, and there is a tendency that the lower the boosted voltage VH, the smaller the maximum value Tgm becomes.

Figure 8:
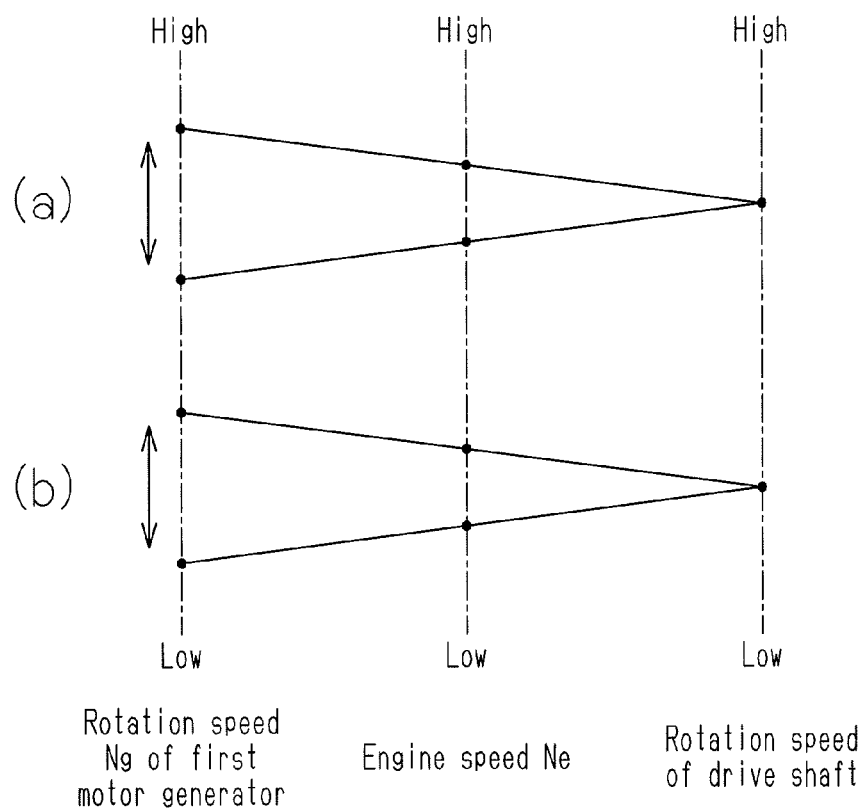
FIG. 8 is an explanatory diagram showing a relationship among the rotation speed of the drive shaft, the engine speed, and the rotation speed of the first motor generator when the vehicle speed is high and low.

There is also a tendency that as the vehicle speed V rises, the maximum value Tgm of the negative torque Tg caused by the first motor generator 4 becomes small. This is because three speeds, i.e., the rotation speed of the drive shaft 3 (corresponding to vehicle speed V), the engine speed Ne, and the rotation speed Ng of the first motor generator 4 are related to each other as shown in FIG. 8. In FIG. 8, section (a) shows the relationship among the three speeds when vehicle speed is high, and section (b) shows the relationship among the three speeds when the vehicle speed is low. When an attempt is made to adjust the engine speed Ne under a condition in which the rotation speed of the drive shaft 3 (vehicle speed V) is constant both when vehicle speed is low and when vehicle speed is high, it is necessary to change the rotation speed Ng of the first motor generator 4 as shown by arrows. However, when the vehicle speed is high shown in section (a), it is necessary to change the rotation speed Ng of the first motor generator 4 in a higher rotation region when the engine speed Ne is adjusted as compared with the case where the vehicle speed is low shown in section (b). Hence, the higher the vehicle speed V, the higher the rotation speed Ng of the first motor generator 4 becomes. Accordingly, there is a tendency that the maximum value Tgm of the negative torque Tg caused by the first motor generator 4 becomes small as shown in FIG. 8.

Since the above-described relationship exists between the rotation speed Ng of the first motor generator 4 and the maximum value Tgm of the negative torque Tg, if the target boost pressure of the internal combustion engine 1 is set based on only the engine operation state such as the output torque Te and the engine speed Ne of the internal combustion engine 1, there is a possibility that the following situation will arise. That is, since the target boost pressure of the internal combustion engine 1 is set without taking into account the operation state (rotation speed Ng and the like) of the first motor generator 4, the target boost pressure of the internal combustion engine 1 is set to a high value when the first motor generator 4 is in such an operation state that the maximum value Tgm of the negative torque Tg, which can act on the internal combustion engine 1, becomes small.

Under such a situation, when the boost pressure of the internal combustion engine 1 is adjusted to coincide with the target boost pressure, if the boost pressure of the internal combustion engine 1 temporarily excessively rises due to variation or the like of the engine operation state and the output torque Te of the engine excessively rises, there is a concern that the negative torque Tg, which is caused by the first motor generator 4 and acts on the internal combustion engine 1, cannot suppress the excessive rise in the engine speed Ne. More specifically, when the negative torque Tg of the first motor generator 4 is made to act on the internal combustion engine 1 for limiting the engine speed Ne to the target value Net, there is a concern that even if the negative torque Tg is set to the maximum value Tgm, the engine speed Ne cannot be limited to the target value Net. If the engine speed Ne cannot be limited to the target value Net even if the maximum value Tgm of the negative torque Tg is made to act on the internal combustion engine 1, the engine speed Ne excessively rises with respect to the target value Net.

In a state where the negative torque Tg caused by the first motor generator 4 acts on the internal combustion engine 1, i.e., under a situation in which electricity is generated in the first motor generator 4 by the internal combustion engine 1, if the engine speed Ne excessively rises as described above, the power generation amount of the first motor generator 4 will become excessive and the durability of components will deteriorate due to overcurrent.

To solve this problem, in the present embodiment, the higher the rotation speed Ng of the first motor generator 4, the lower the target boost pressure of the internal combustion engine 1 is set. On the assumption that the boost pressure of the internal combustion engine 1 is adjusted to coincide with the target boost pressure, which is variable based on the operation state (rotation speed Ng) of the first motor generator 4, in addition to the engine operation state, the fuel economy optimal line (solid line) in FIG. 3 is determined, and the required value Ter of the output torque Te and the target value Net of the engine speed Ne of the internal combustion engine 1 are calculated by the processing of S5 in FIG. 2 using the fuel economy optimal line. Further, in a state where the boost pressure of the internal combustion engine 1 is made to match with the target boost pressure, the internal combustion engine 1 is controlled such that the output torque Te of the engine 1 becomes equal to the required value Ter. The output torque Te of the internal combustion engine 1 is adjusted to coincide with the required value Ter, and the magnitude of the negative torque Tg, which is caused by the first motor generator 4 and acts on the internal combustion engine 1, is adjusted through control of the first motor generator 4 to limit the engine speed Ne to the target value Net.

By the above-described operations, the higher the rotation speed Ng of the first motor generator 4, the lower the boost pressure when the output torque Te of the internal combustion engine 1 is adjusted to coincide with the required value Ter is set. Therefore, the higher the rotation speed Ng of the first motor generator 4, the lower the target boost pressure of the internal combustion engine 1 is set as described above. At this time, the target boost pressure is set such that the higher the rotation speed Ng of the first motor generator 4, the lower the boost pressure when the output torque Te of the internal combustion engine 1 is adjusted to coincide with the required value Ter becomes.

Next, operation of the control apparatus for a vehicle of the present embodiment will be described.

Figure 9:
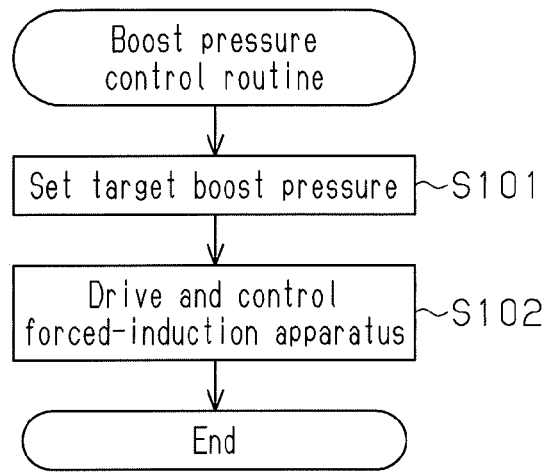
FIG. 9 is a flowchart showing execution procedure of boost pressure control of the internal combustion engine.

FIG. 9 is a flowchart showing execution procedure of the control of the boost pressure. A boost pressure control routine shown in FIG. 9 is periodically executed as an interrupt at predetermined time intervals during operation of the internal combustion engine 1 through the electronic control apparatus 15. In this routine, first, target boost pressure is set based on the engine operation state such as output torque Te and the engine speed Ne of the internal combustion engine 1, the rotation speed Ng of the first motor generator 4, and the boosted voltage VH, which is for operating the first motor generator 4 (S101). As parameters such as the output torque Te, the engine speed Ne, and the rotation speed Ng of the first motor generator 4, it is possible to use actual measured values (current values) measured by sensors for these parameters, and to use target values of the parameters that are set through the electronic control apparatus 15. As target values of the output torque Te and the engine speed Ne, it is possible to use the required value Ter and the target value Net calculated in the processing of S5 shown in FIG. 2.

Figure 10:
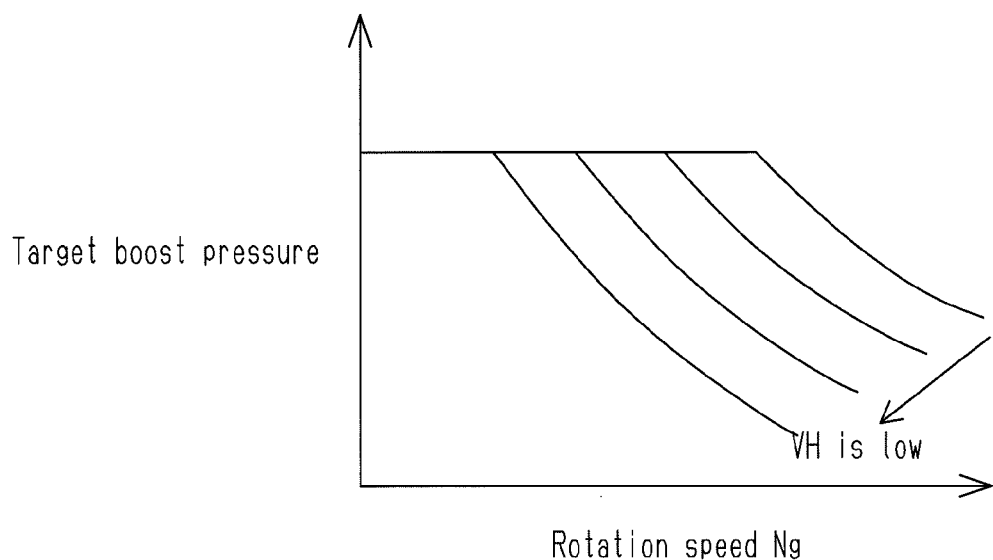
FIG. 10 is a graph showing changes in the target boost pressure in response to variation in the vehicle speed and the boosted voltage.

As shown in FIG. 10, for example, the target boost pressure is set in the processing in S101 such that the higher the rotation speed Ng, the lower the target boost pressure becomes, and such that the lower the boosted voltage VH, the lower the target boost pressure becomes. Thereafter, the forced-induction apparatus 1a (variable boost pressure mechanism) is driven and controlled such that the boost pressure of the internal combustion engine 1 matches with the set target boost pressure (S102). According to this, the rotation speed Ng becomes high, and as the feasible maximum value Tgm of the negative torque Tg, which acts on the internal combustion engine 1 by the first motor generator 4, becomes smaller, the boost pressure of the internal combustion engine 1 can be made lower. Further, the boosted voltage VH becomes low, and as the feasible maximum value Tgm, which can acts on the internal combustion engine 1 by the first motor generator 4, becomes smaller, the boost pressure of the internal combustion engine 1 can be made lower.

In a state where the boost pressure is low, the output torque Te of the internal combustion engine 1 is less prone to rise. Therefore, even if the engine operation state are varied and the boost pressure temporarily and excessively rises, the output torque Te of the internal combustion engine 1 can be made less prone to rise temporarily. Therefore, when the negative torque Tg is made to act on the internal combustion engine 1 by the first motor generator 4 to limit the engine speed Ne to the target value Net, the output torque Te of the internal combustion engine 1 is prevented from temporarily and excessively rising under a situation in which a feasible maximum value Tgm of the negative torque Tg becomes small. Accordingly, the negative torque Tg is prevented from being insufficient, and the engine speed Ne is thus allowed be limited to the target value Net. In other words, it is possible to restrain the engine speed Ne from excessively rising in relation to the target value Net. Further, in a state in which the maximum value Tgm of the negative torque Tg acts on the internal combustion engine 1 by the first motor generator 4, the engine speed Ne is prevented from excessively rising in relation to the target value Net as described above. Thus, the power generation amount of the first motor generator 4 will not be excessively increased, and the durability of components will not deteriorate due to overcurrent.

According to the present embodiment, which is described above, the following advantage is achieved.

(1) The engine speed Ne is prevented from excessively rising in relation to the target value Net due to a rise in the boost pressure caused by the forced-induction device in the internal combustion engine 1. Also, the durability of the components is prevented from being reduced due to overcurrent caused by an excessively increased power generation amount of the first motor generator 4. While preventing the drawbacks, it is possible to adjust the output torque Te of the internal combustion engine 1 to coincide with the required value Ter whenever possible.

The above described embodiment may be modified as follows.

The configuration in which the higher the rotation speed Ng of the first motor generator 4, the lower the target boost pressure is set can be realized in the following manner. The higher the rotation speed Ng, the lower the target boost pressure is set based on the vehicle-required power Pt calculated in the processing of S4 shown in FIG. 2 and the rotation speed Ng of the first motor generator 4 detected by the rotation speed sensor 18. In this case, it is preferable that, under a condition in which the boost pressure of the internal combustion engine 1 caused by the forced-induction device is adjusted to coincide with the target boost pressure, an optimal operational point of the internal combustion engine 1, i.e., a combination of the output torque and the rotation speed of the internal combustion engine is obtained, the output torque in this combination is set to the required value Ter, and the engine speed in this combination is set to the target value Net.

In the above embodiment, the current value (the actual measured value) obtained based on a detection signal from the rotation speed sensor 18 is used as the rotation speed Ng of the first motor generator 4, which is a parameter for setting target boost pressure. However, it is also possible to use a target value that is set by the electronic control apparatus 15. This target value is calculated through the electronic control apparatus 15 based on the vehicle speed (corresponding to rotation speed of second motor generator 5) and the target value Net of the engine speed Ne. The value calculated in this manner is set as the target value of the rotation speed Ng of the first motor generator 4 by the electronic control apparatus 15.

The configuration in which the higher the rotation speed Ng of the first motor generator 4, the lower the target boost pressure is set can be realized also in the following manner. That is, the target boost pressure is set based on the engine operation state such as output torque Te and engine speed Ne of the internal combustion engine 1, and the higher the rotation speed Ng of the first motor generator 4, the lower the upper limit value for limiting the upper limit of the target boost pressure is set. By limiting the target boost pressure by the upper limit value that is set in this manner, the higher the rotation speed Ng of the first motor generator 4, the lower the target boost pressure becomes. In this case, it is preferable that the required value Ter of the output torque Te of the internal combustion engine 1 is set as a value under a situation in which the boost pressure is lower than or equal to the upper limit value of the target boost pressure.

The configuration in which the higher the rotation speed Ng of the first motor generator 4, the lower the target boost pressure is set may be executed only when a failure caused by power generation of the first motor generator 4 arises. Examples of the case where a failure caused by power generation of the first motor generator 4 arises include a case where the first motor generator 4 excessively generates electricity and the temperature of the first motor generator 4 becomes abnormally high, and a case where the power generation of the first motor generator 4 is limited to suppress overcharge of the battery of the vehicle caused by the power generation of the first motor generator 4. When a failure caused by the power generation of the first motor generator 4 arises, it is difficult to increase the negative torque Tg when it is caused to act on the internal combustion engine 1 by the first motor generator 4. Therefore, it is likely that excessive rise in the engine speed Ne will not be suppressed due to the shortage of the negative torque Tg. Only in such a situation, the higher the rotation speed Ng of the first motor generator 4, the lower the target boost pressure is set. Accordingly, it is possible to suppress the generation of the above-described problem without uselessly executing the variable setting of the target boost pressure based on the rotation speed Ng.

The configuration in which the higher the rotation speed Ng of the first motor generator 4, the lower the target boost pressure is set can be realized not only by including the rotation speed Ng into a parameter used for calculation of the target boost pressure, but also by changing the engine operation state such that the target boost pressure becomes low through a driving and control operation of the internal combustion engine 1.

When the throttle opening degree of the internal combustion engine 1 is controlled such that the output torque Te of the engine 1 becomes equal to the required value Ter, if the output torque Te of the internal combustion engine 1 is insufficient with respect to the required value Ter, the throttle opening degree of the internal combustion engine 1 is increased to compensate for the shortage, and the output torque Te is adjusted to coincide with the required value Ter whenever possible. At that time, the following processing may be added. That is, when shortage of the output torque Te with respect to the required value Ter is too great to be compensated for by increase in the throttle opening degree, the negative torque Tg, which acts on the internal combustion engine 1 by the first motor generator 4, is reduced, and the engine speed Ne is increased. Accordingly, it is possible to prevent the power (corresponding to "Te·Ne") that is output from the internal combustion engine 1 due to shortage of the output torque Te from being affected. Further, when the engine speed Ne becomes higher than or equal to a permissible upper limit value that is for suppressing failure of the internal combustion engine 1 due to rise in the engine speed Ne, the throttle opening degree of the internal combustion engine 1 is reduced. Hence, it is possible to prevent the engine speed from excessively rising, and it is possible to suppress failure of the internal combustion engine 1 due to the excessive rise.

As the forced-induction device in the forced-induction apparatus 1a, it is possible to employ a variable displacement turbocharger. In this case, since the boost pressure can be varied by changing the displacement of the turbocharger, the turbocharger can function also as a variable boost pressure mechanism.

As the forced-induction device in the forced-induction apparatus 1a, it is possible to employ a mechanical supercharger or an electric supercharger. When a mechanical supercharger is employed as the forced-induction device, a valve for releasing supercharged air caused by the supercharger from the intake system of the internal combustion engine 1 may be provided as the variable boost pressure mechanism. When an electric supercharger is employed as the forced-induction device, since the boost pressure can be varied by driving and controlling the supercharger, this supercharger functions also as the variable boost pressure mechanism.

Although the present invention is applied to a split type hybrid vehicle as a vehicle including a motor and an internal combustion engine as drive sources, the invention may be applied to a series type hybrid vehicle or a parallel type hybrid vehicle.

Although the present invention is applied to the vehicle having two motor generators, the invention may be applied to a vehicle in which one motor generator is made to function as a motor or an electricity generator as occasion demands.

In a series type or parallel type hybrid vehicle, it is not absolutely necessary to make the engine speed match with a target value by adjusting the magnitude of the negative torque that is caused by the electric motor-generator and acts on the internal combustion engine.

DESCRIPTION OF THE REFERENCE NUMERALS

1 . . . internal combustion engine, 1a . . . forced-induction apparatus, 2 . . . power-split gear mechanism, 3 . . . drive shaft, 4 . . . first motor generator, 5 . . . second motor generator, 6 . . . battery, 7 . . . inverter, 8 . . . accelerator pedal, 9 . . . accelerator position sensor, 10 . . . vehicle speed sensor, 11 . . . wheel, 12 . . . counter gear, 13 . . . final gear, 14 . . . reduction gear mechanism, 15 . . . electronic control apparatus, 16 . . . crank position sensor, 17 . . . pressure sensor, 18 . . . rotation speed sensor

The invention claimed is:

1. A control apparatus for a vehicle that includes an internal combustion engine with a forced-induction apparatus, an electric motor-generator that generates electricity while applying negative torque to the engine, and a battery in which electricity generated by the electric motor-generator is stored, wherein
the forced-induction apparatus includes a forced-induction device and a variable boost pressure mechanism that varies boost pressure caused by the forced-induction device,
the control apparatus sets a required value of output torque of the engine in accordance with an accelerator operation amount,
the control apparatus controls the variable boost pressure mechanism such that the boost pressure is adjusted to coincide with a target boost pressure that is set based on an operation state of the internal combustion engine,
the control apparatus further comprises a controller,
the higher rotation speed of the electric motor-generator, the lower the target boost pressure set by the controller becomes,
in a state where the boost pressure is made to match with the target boost pressure, the controller controls the internal combustion engine such that output torque of the internal combustion engine becomes equal to the required value, which is determined by the accelerator operation amount.

2. The control apparatus for a vehicle according to claim 1, wherein the controller sets the target boost pressure such that the higher rotation speed of the electric motor-generator, the lower the boost pressure when the output torque of the internal combustion engine is adjusted to coincide with the required value is set.

3. The control apparatus for a vehicle according to claim 1, wherein
the controller sets an upper limit value of the target boost pressure, which is set based on the engine operation state, such that the higher the rotation speed of the electric motor-generator, the lower the upper limit value becomes,
the controller limits the target boost pressure by the upper limit value such that the higher the rotation speed of the electric motor-generator, the lower the target boost pressure becomes, and
the required value of the output torque of the internal combustion engine is set as a value under a situation in which the boost pressure is lower than or equal to the upper limit value of the target boost pressure.

4. The control apparatus for a vehicle according to claim 1, wherein, based on the engine operation state, the rotation speed of the electric motor-generator and voltage for operating the electric motor-generator, the controller sets the target boost pressure such that the higher the rotation speed of the electric motor-generator, the lower the target boost pressure becomes, and such that the lower the voltage, the lower the target boost pressure becomes.

5. The control apparatus for a vehicle according to claim 1, wherein
the vehicle is provided with a differential device including a first rotation element, a second rotation element, and a third rotation element,
power that is output from the internal combustion engine is transmitted to a drive shaft of the vehicle and the electric motor-generator through the differential device,
the first rotation element is connected to the internal combustion engine,
the second rotation element is connected to the electric motor-generator,
the third rotation element is connected to the drive shaft, and
the controller adjusts the magnitude of the negative torque that is caused by the electric motor-generator and acts on the internal combustion engine, thereby controlling the engine speed to become a target value.

6. The control apparatus for a vehicle according to claim 5, wherein
the differential device is provided with a planetary gear train including a planetary gear, which is the first rotation element, a sun gear, which is the second rotation element, and a ring gear, which is the third rotation element,
the internal combustion engine is connected to the planetary gear such that rotation can be transmitted,
the electric motor-generator is connected to the sun gear such that rotation can be transmitted, and
the drive shaft is connected to the ring gear such that rotation can be transmitted.

7. The control apparatus for a vehicle according to claim 1, wherein only when a failure occurs due to generation of electricity by the electric motor-generator, the controller sets the target boost pressure such that the higher the rotation speed of the electric motor-generator, the lower the target boost pressure becomes.

8. The control apparatus for a vehicle according to claim 1, wherein
when the controller controls the internal combustion engine such that the output torque of the internal combustion engine becomes equal to the required value, which is determined by the accelerator operation amount, if the output torque of the internal combustion engine is less than the required value, the controller increases a throttle opening degree of the internal combustion engine to compensate for the shortage of the output torque, when the shortage cannot be compensated for by increasing the throttle opening degree, the controller reduces the negative torque, which is applied to the internal combustion engine by the electric motor-generator, to increase the engine speed, and when the engine speed becomes higher than or equal to a permissible upper limit value due to rise in the engine speed, the controller reduces the throttle opening degree of the internal combustion engine to restrain the rise in the engine speed.

9. The control apparatus for a vehicle according to claim 1, wherein the forced-induction device is a turbocharger that is driven by flow of exhaust gas of the internal combustion engine.

* * * * *